United States Patent
Pan et al.

(10) Patent No.: US 10,363,715 B2
(45) Date of Patent: Jul. 30, 2019

(54) METHODS AND APPARATUS FOR MAKING RETREADED TIRES

(71) Applicants: Chinglin Pan, Mauldin, SC (US); Ronald Cress, Simpsonville, SC (US); Michael D. Petrovich, Simpsonville, SC (US)

(72) Inventors: Chinglin Pan, Mauldin, SC (US); Ronald Cress, Simpsonville, SC (US); Michael D. Petrovich, Simpsonville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 396 days.

(21) Appl. No.: 14/439,173

(22) PCT Filed: Oct. 31, 2012

(86) PCT No.: PCT/US2012/062858
§ 371 (c)(1),
(2) Date: Apr. 28, 2015

(87) PCT Pub. No.: WO2014/070173
PCT Pub. Date: May 8, 2014

(65) Prior Publication Data
US 2015/0298411 A1    Oct. 22, 2015

(51) Int. Cl.
*B29D 30/54*     (2006.01)

(52) U.S. Cl.
CPC ........... *B29D 30/54* (2013.01); *B29D 30/542* (2013.01)

(58) Field of Classification Search
CPC ...... B29D 30/54; B29D 30/542; B29D 30/56; B29D 2030/543; B29D 2030/544; B29D 2030/545
See application file for complete search history.

(56) References Cited

U.S. PATENT DOCUMENTS

| 2,966,936 A | * | 1/1961 | Sckelkmann | B29D 30/542 |
| | | | | 152/209.6 |
| 3,455,753 A | * | 7/1969 | Schelkmann | B29D 30/52 |
| | | | | 152/187 |

(Continued)

FOREIGN PATENT DOCUMENTS

| DE | 1035891 | * | 8/1958 | ............ B29D 30/54 |
| DE | 2726381 | * | 12/1977 | ............ B29H 17/37 |

(Continued)

OTHER PUBLICATIONS

Machine generated English language translation of JP 61-238502 (original document date Oct. 1986).*

(Continued)

*Primary Examiner* — Robert C Dye
*Assistant Examiner* — Cedrick S Williams
(74) *Attorney, Agent, or Firm* — Hahn Loeser & Parks LLP

(57) ABSTRACT

Embodiments of the invention include methods for supporting a recessed void during retreading operations. Such methods include the steps of providing a tread having a top side and a bottom side, the tread including a recessed void recessed below the top side of the tread. Such methods also include the step of arranging the tread around an outer circumference of the tire carcass in a desired position to form an assembled retreaded tire. Such methods further include the step of arranging a removable circumferential band around the assembled retreaded tire positioned over top the recessed void and the top side of the tread. Such methods further include the steps of placing a curing membrane around at least a portion of the tire and the circumferential band and curing the retreaded tire with the circumferential band contained within the curing membrane.

16 Claims, 5 Drawing Sheets

(56) References Cited

U.S. PATENT DOCUMENTS

| | | | | |
|---|---|---|---|---|
| 3,837,385 | A | * | 9/1974 | Schelkmann ........ B29D 30/542 156/382 |
| 3,884,740 | A | * | 5/1975 | Schelkmann ........ B29D 30/542 156/129 |
| 3,976,532 | A | * | 8/1976 | Barefoot ................ B29D 30/56 156/126 |
| 3,983,193 | A | | 9/1976 | Wulker et al. |
| 4,075,047 | A | * | 2/1978 | Brodie ................ B29C 35/0233 156/96 |
| 4,147,642 | A | * | 4/1979 | Schelkmann .......... B29D 30/56 156/129 |
| 4,328,053 | A | * | 5/1982 | Medlin, Jr. ............ B29D 30/56 156/394.1 |
| 5,603,366 | A | * | 2/1997 | Nakayama ........... B29D 30/542 152/209.15 |
| 5,882,471 | A | * | 3/1999 | Chandler ................ B29C 33/10 156/286 |
| 6,343,636 | B1 | * | 2/2002 | Hanya ....................... B60C 9/20 152/209.24 |
| 6,352,091 | B1 | * | 3/2002 | Hanya ................ B60C 11/0302 152/209.2 |
| 6,591,881 | B2 | | 7/2003 | Artrip |
| 6,640,979 | B1 | * | 11/2003 | Mayfield .................. B62H 3/00 211/20 |
| 7,208,110 | B2 | | 4/2007 | Lopez et al. |
| 7,249,620 | B2 | | 7/2007 | Croissant et al. |
| 7,252,728 | B2 | | 8/2007 | Weydert et al. |
| 7,581,575 | B2 | | 9/2009 | Corvasce et al. |
| 2006/0151079 | A1 | | 7/2006 | Weydert et al. |
| 2009/0008009 | A1 | * | 1/2009 | Mosko .................... B60C 11/24 152/154.2 |
| 2009/0199944 | A1 | * | 8/2009 | Goto ....................... B60C 11/02 152/209.17 |
| 2010/0051175 | A1 | * | 3/2010 | Chateau ............... B29D 30/542 156/96 |
| 2011/0214789 | A1 | | 9/2011 | Cress et al. |
| 2011/0277898 | A1 | * | 11/2011 | Barraud .............. B60C 11/0306 152/209.18 |
| 2014/0318678 | A1 | * | 10/2014 | Colby .................... B60C 23/19 152/209.18 |

FOREIGN PATENT DOCUMENTS

| | | | | |
|---|---|---|---|---|
| EP | 1772293 | A1 | | 4/2007 |
| EP | 1857263 | | * | 11/2007 ............. B29D 30/52 |
| EP | 1857263 | A1 | * | 11/2007 ............. B29D 30/52 |
| FR | 1411387 | | * | 10/1964 ........... B29D 30/542 |
| FR | 2178096 | | * | 11/1973 ........... B29D 30/542 |
| GB | 555680 | | * | 9/1943 ............. B29D 30/54 |
| GB | 746375 | | * | 3/1956 ............. B29D 30/54 |
| JP | 61-238502 | | * | 10/1986 ............. B60C 11/06 |
| JP | 62-48536 | | * | 3/1987 ............. B29D 30/56 |
| JP | 09-70903 | | * | 3/1997 ............. B29D 30/56 |
| JP | 2001039115 | A | | 2/2001 |
| JP | 2005028946 | A | | 2/2005 |
| WO | 2010151263 | A1 | | 12/2010 |
| WO | 2011048516 | A1 | | 4/2011 |
| WO | 2012028429 | A1 | | 3/2012 |

OTHER PUBLICATIONS

Machine generated English language translation of JP 62-48536 (original document dated Mar. 1987).*
Machine generated English language translation of DE 1035891 (original document dated Aug. 1958).*
Machine generated English language translation of JP 09-70903 (original document dated Sep. 1997) (Year: 1997).*
Machine generated English language translation of JP DE 1411387 (original document dated Oct. 1964) (Year: 1964).*
Machine generated English language translation of EP 1857263 (original document dated Nov. 2007) (Year: 2007).*
Machine generated English language translation of FR 2178096 (original document dated Nov. 1973) (Year: 1973).*
Machine generated English language translation of DE 2726381 (Original document dated Dec. 1977) (Year: 1977).*
PCT/US2012/062858 International Search Report & Written Opinion, dated Jan. 15, 2013, 7 pages.

* cited by examiner ically, to methods for rein-
METHODS AND APPARATUS FOR MAKING RETREADED TIRES This application is a National Stage application of International Application No. PCT/US2012/062858, filed Oct. 31, 2012.

BACKGROUND OF THE INVENTION

Field of the Invention

This invention relates generally to methods for making retreaded tires, and more particularly, to methods for reinforcing or preserving the dimensions or shape of recessed voids in the tire tread during tire retreading operations.

Description of the Related Art

Retreaded tires are commonly manufactured by affixing a new tread atop an existing tire carcass, and securing the tread to the carcass by way of a curing process. In preparation for the curing process, a curing membrane or envelope is arranged about the tread to maintain the tread in a desired position atop the tire carcass and to create a seal between the retreaded tire assembly and the curing membrane. A bonding layer may be interposed between the tread and the tire carcass to promote bonding. Vacuum pressure is applied to the area between the curing membrane and the tread to substantially remove the air between the curing membrane and the tire assembly. The retread tire assembly with curing membrane is placed within a curing chamber, which often referred to as an autoclave, to bond the tread to the tire carcass, where the membrane-covered assembly is exposed to heat and pressure according to a desired curing process.

It is known for retread tire treads to include recessed voids arranged within the tread thickness and recessed from an outer, ground-engaging surface of the tread. For example, recessed voids may comprise circumferential or lateral grooves arranged along the underside of the tread or within the tread thickness between both the outer, ground-engaging surface and the underside of the tread. In prior tire retreading processes, recessed voids can become misshapen or deformed due to curing forces caused by the vacuum pressure and/or curing pressure. Additionally, recessed voids experienced an internal pressure different from the pressure applied to the outer tread surface due to air being trapped within said voids. This pressure differential tends to increase when pressure was applied to the tire by the autoclave. These compression problems tend to reduce void volume and altered the shape of the void, particularly when the tread material around the recessed void was thinner, such as for a thin tread application. This is compounded when bonding material becomes more malleable or fluid as the assembly is heated during the curing process.

SUMMARY OF THE INVENTION

Particular embodiments of the present invention include methods and apparatus for stabilizing the recessed voids during the process of retreading a tire carcass. Such methods include the step of providing a tread having a top side configured to engage a ground surface during tire operation and a bottom side configured to attach to an annular tire carcass configured for receiving the tread, the tread including a recessed void recessed below the top side of the tread. A further step includes arranging the tread around an outer circumference of the tire carcass in a desired position to form an assembled retreaded tire. A further step includes arranging a removable circumferential band around the assembled retreaded tire positioned over top the recessed void and the top side of the tread. A further step includes placing a curing membrane around at least a portion of the tire and the circumferential band. A further step includes curing the retreaded tire with the circumferential band contained within the curing membrane.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

FIG. 1 is a partial perspective view of a retreaded tire assembly having a circumferential band about an outer, ground-engaging tread surface of the tire and showing a partial cut-away of a curing membrane positioned in an installed arrangement about the tire, where a pressurization compartment arranged between the curing membrane and the tread is placed under pressure according to an exemplary embodiment of the invention.

DETAILED DESCRIPTION OF PARTICULAR EMBODIMENTS

Figure 1:
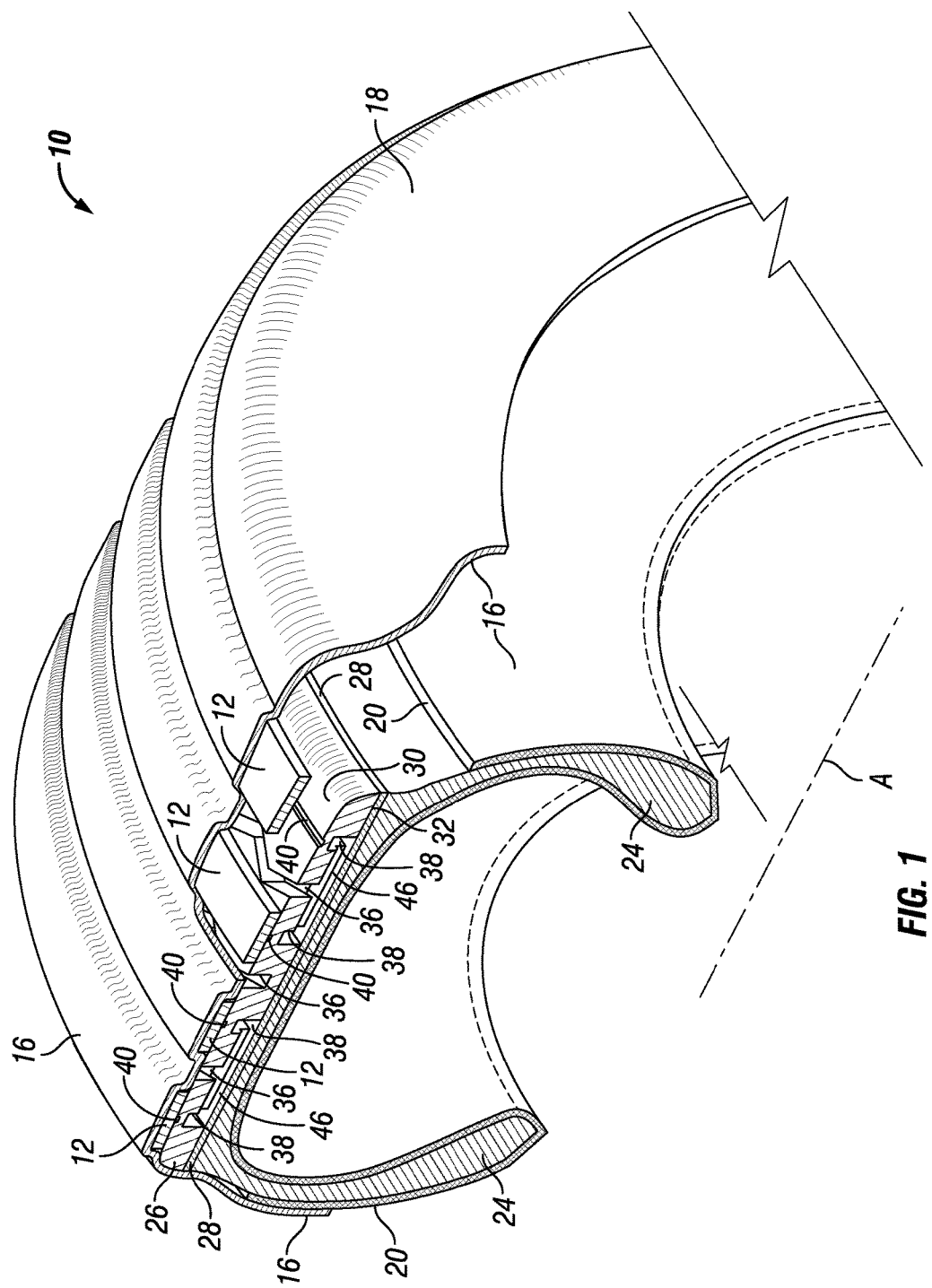

Particular embodiments of the present invention provide methods and apparatus for maintaining shape and/or volume of a recessed void positioned beneath a tread outer surface when forming a retreaded tire. By employing such methods and apparatus, the shape, volume, and arrangement of recessed voids positioned beneath the tread outer surface are better maintained. In particular embodiments, such methods and apparatus inhibit the deformation of the recessed voids.

Such methods may comprise methods for retreading a tire carcass (i.e., tire casing), which may comprise a variety of steps. In particular embodiments, such methods include the step of providing an annular tire carcass configured for receiving a tread. During retreading operations, an existing tire is typically prepared by removing at least a portion of the original tread from the tire through an abrading or buffing operation. The remaining portion of the tire is generally referred to as the tire carcass. For example, the tire carcass forms an annular article generally including a pair of opposing sidewalls each extending radially outward from a bead to a central portion extending laterally between the sidewalls. During the retreading process, a tread is arranged along an outer side of the central portion to form a retreaded tire. It is generally understood that the tire carcass is previously manufactured, that is, previously molded and cured (or, in other words, vulcanized). Any desired tread and tire carcass may be employed. An exemplary tire tread and tire carcass are discussed further below with reference to the figures.

Particular embodiments of such methods may include the step of providing a tread having a top side configured to engage a ground surface during tire operation and a bottom side configured to attach to an annular tire carcass configured for receiving the tread, the tread including a recessed void arranged below the top side of the tread. Tire treads are often formed to include a tread pattern along an outer side or face (i.e., a top side or face) of the tread for engagement with a ground surface during tire operation. In particular instances, the tread pattern includes tread features comprising voids or discontinuities arranged along the top side. For example, discontinuities may comprise sipes which can form slits in the tread thickness. Sipes may also form thin voids, such as when molded or cut into the tread. By further example, voids may comprise grooves, such as longitudinal and/or lateral grooves, for example. Longitudinal grooves generally extend lengthwise along a length of the tread, while lateral grooves generally extend in a widthwise direction of the tread. Longitudinal grooves may extend continuously around the tire to form circumferential grooves when the tread is arranged on a tire. Lateral grooves may also extend continuously across the width of the tread. It is understood that any grooves may extend lengthwise along any linear or nonlinear path. Furthermore, it is understood that any groove may extend continuously or discontinuously along the full length or width of the tread. Tread features comprising voids arranged along the top side are referred to herein as outer or top voids or top-side voids.

Treads may further include recessed voids (i.e., submerged or hidden voids) arranged below the top side, which may comprise voids arranged along the bottom side of the tread or voids arranged within a thickness of the tread between the top side and the bottom side. Recessed voids may comprise any void that may be arranged below the top side of the tread as discussed above. Furthermore, a vent passageway may extend from a recessed void to a top void or the top side. In either instance, the recessed void is in fluid communication with the top side through the vent passageway.

Further steps of such methods may include the step of arranging the tread around an outer circumference of the tire carcass in a desired position to form an assembled retreaded tire. Tire retreading generally comprises placing a new tread on the pre-existing tire carcass. The new tread may be molded, and at least a portion thereof fully or partially cured prior to its application upon a tire carcass. Prior to applying the tread to the tire carcass, old tread material may be removed from the tire carcass if desired and a bonding material arranged between the new tread and the tire carcass to promote adhesion there between. The bonding material may comprise any known material suitable for its intended purpose of bonding the new tread to the tire carcass. For example, the joining material may include an adhesive or material curable by way of vulcanization, such as natural or synthetic rubber or any other elastomeric and/or polymeric material, which is commonly referred to as liaison rubber or cushion gum.

Particular embodiments of the present methods may include the step of arranging a circumferential band around the assembled retreaded tire positioned overtop the recessed void and the top side of the tread. Generally, the band is positioned above the recessed void providing additional material thickness and support above and/or around the recessed void to resist the forces being applied to the tread during the curing process. In particular instances, the band is arranged along the top side of the tread, with the understanding that in other instances a thin layer or sheet of material may be arranged between the band and the tread to promote removal of the band from the tread at the conclusion of the curing process. The band may be removable for other reasons, such as by forming the band from, or coating the band with, a material that will not bond with or adhere to the tread during curing operations. The step of arranging the circumferential band may include expanding the band prior to arrangement around the retreaded tire. For example, the circumferential band may be formed of an elastomeric material having an unstretched circumference smaller than the circumference of the assembled retreaded tire. For example, the unstretched circumference of the band may be between 2% and 15% smaller than the circumference of the assembled retreaded tire. To provide improved benefits for maintaining the shape and/or dimensional integrity of any recessed void, it is understood, that in particular embodiments, the circumferential band has a width larger than a lateral dimension of the recessed void. In particular instances, the circumferential band has a width at least equal to a widthwise extent of the recessed void or larger than a widthwise extent of the recessed void. An exemplary band is discussed below in conjunction with the figures filed herewith.

Further steps of the present method may include the step of placing a curing membrane around an outer circumference of the circumferential band, an outer circumference of the tread, and at least a portion of the tire. It is understood that any known curing membrane to one of ordinary skill in the art, and any obvious variation thereof, may be employed in performing this step. Curing membranes are also referred to as curing envelopes within the industry. Generally, a curing membrane includes an outer body, shell, or membrane having a tread portion extending annularly to circumscribe the tread. The body includes a thickness and extends widthwise in a lateral or axial direction. The outer body typically extends widthwise the full width of the tread, and may extend further. The body may comprise one or more sections to achieve its purpose of covering the outer tread surface and becoming sealed to create an interior pressurization compartment between the tread and the curing membrane, which initially is placed under vacuum pressure during retread curing operations to substantially remove the air between the curing membrane and the tire assembly, and then is exposed to increased pressure to aid in the curing process. In one example, the pressure inside the curing membrane may reach between about 0.4 MPa to 0.7 MPa (4 to 7 bar); however, the particular pressure will depend on the various methods used for curing the retreaded tire assembly. Exemplary membranes may partially cover tire carcass, such as when the curing membrane extends down each sidewall to engage a wheel upon which the tire carcass is mounted and cured. An exemplary retread curing membrane fully encompassing the retreaded tire is discussed below in conjunction with the figures filed herewith.

Particular embodiments of the present methods may include the step of curing the retreaded tire with the circumferential band arranged between the tread and the curing membrane. To form the retreaded tire, the assembled retreaded tire having an uncured bonding layer must be cured to bond the new tread to the tire carcass. Any method known in the art using a curing membrane may be employed to cure the retreaded tire assembly to form a retreaded tire. For example, the assembled retreaded tire may be arranged within a curing chamber known as an autoclave, where the tire is at least partially surrounded by air or other fluids heated and pressurized according to desired curing formulas or laws. This may include applying pressurized and heated fluids about the tire, or at least about an outer side of the assembled retreaded tire. This may also include expanding a curing bladder, such as by filling the curing bladder with a heated, pressurized fluid, within a central cavity of the tire carcass. Accordingly, particular embodiments of methods for tire retreading further include the step of placing the assembled retreaded tire with the curing membrane arranged thereabout into a curing chamber.

Other variations may be employed based upon the curing system or method employed. In particular embodiments, for example, the uncured, assembled retreaded tire is placed at least partially within the curing membrane or envelope for at least curing operations within a curing chamber. The curing membrane generally engages the outer side or surface of the tire carcass and tread, to form a skin-like member thereon at least extending circumferentially about the tire and laterally between opposing sidewalls and about the tread of the assembled tire. Any known membrane known in the art may be used. For example, one such membrane extends around the entire tire—circumferentially and laterally. By further example, the tire may be mounted on a wheel while a membrane extends from sidewall to sidewall about the tread. Regardless of the membrane employed, a compartment is generally formed between the membrane and the tire (tread and/or tire carcass), which may be pressurized as desired during curing operations.

Particular embodiments of the present methods further include the step of removing the curing membrane and the circumferential band after the step of curing has been performed.

The methods discussed above will now be discussed below in association with exemplary embodiments of the present invention.

As discussed above, a circumferential band may be placed around the outside circumference of a retread tire during the retread curing process providing support for recessed voids within the tread. With reference to FIG. 1, a retread tire assembly 10 is shown with a circumferential band 12 arranged about the retread tire assembly during retread tire curing operations. A curing membrane 16 is positioned about the outer surfaces of the tire assembly 10 and the circumferential band 12. The embodiment shown in FIG. 1 includes the curing membrane 16 having two sections including an outer sleeve 18 and an inner sleeve 20, each sleeve extending annularly to form a ring encircling the retreaded tire assembly.

Generally, the retreaded tire assembly includes a tire carcass 24, a tread 26, and a bonding layer 28 arranged between the tread and tire carcass. The tread 26, comprising an elastomeric material such as natural and/or synthetic rubber, for example, generally forms a ring and is assembled about an outer circumference of the tire carcass. The tread 26 or portions of the tread may be uncured, precured, or partially cured. A bonding layer 28 arranged between the tread 26 and tire carcass 24 facilitates attachment of the tread to the tire carcass. The bonding layer 28 may comprise any known material capable of attaching the tread to the tire carcass, such as an adhesive or a curable elastomer or polymer, which may comprise cushion gum, for example. In particular embodiments, the bonding layer may not be employed, such as when a portion of the tread is uncured or partially cured.

The tread 26 has a top side 30 configured to engage a ground surface during tire operation and a bottom side 32 configured to attach to the tire carcass 24 configured for receiving the tread. The bonding layer 28 is arranged between the bottom side 32 of the tread 26 and the tire carcass 24. To achieve a desired tire performance, the tread 26 includes one or more tread features extending into the depth or thickness of the tread from the top side 30 of the tread, such as, for example, voids 36 comprising grooves and discontinuities comprising sipes, which generally form slits or very narrow grooves within the tread thickness. It is noted that in the exemplary tread shown in FIGS. 1 and 2, the tread features comprise longitudinal grooves 36. Regardless, the tread 26 may include any tread feature desired along the ground-engaging side of the tread. The tread may further include a plurality of tread elements. Tread elements may comprise, for example, ribs or blocks of various shapes and sizes. Generally, ribs extend continuously around the tread circumference, while blocks extend partially around the tread circumference.

Figure 2:
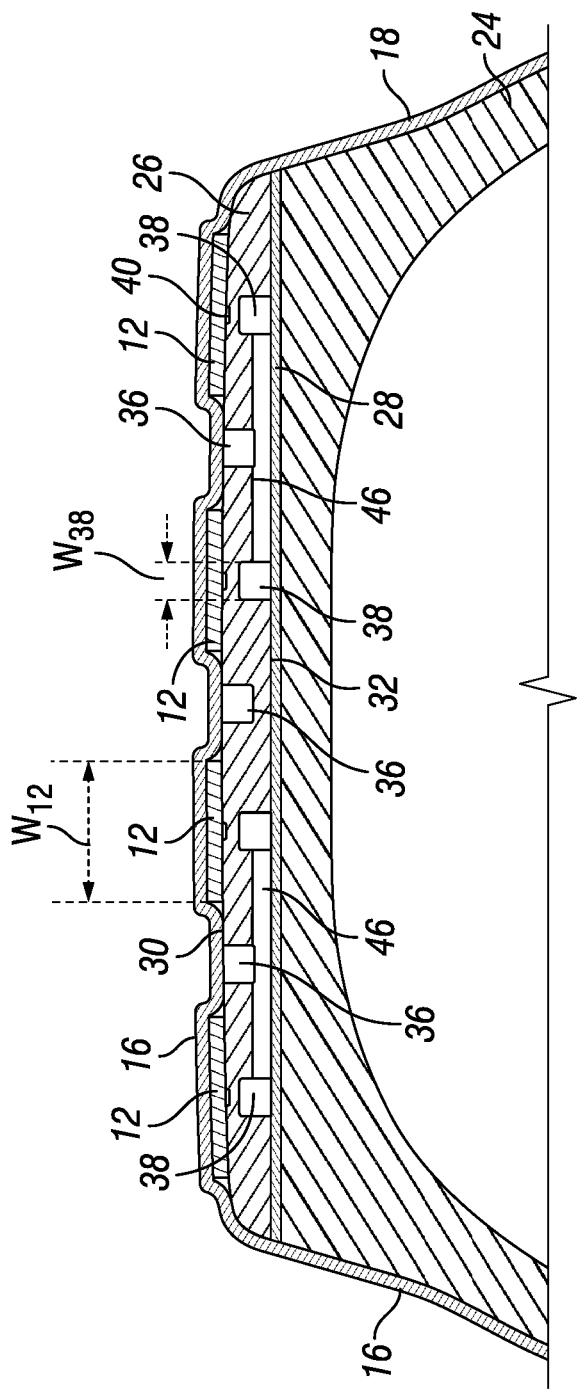
FIG. 2 is a cross-sectional view of the retreaded tire of FIG. 1 having a circumferential band about an outer, ground-engaging tread surface of the tire before placing the pressurization compartment under pressure.
Figure 3:
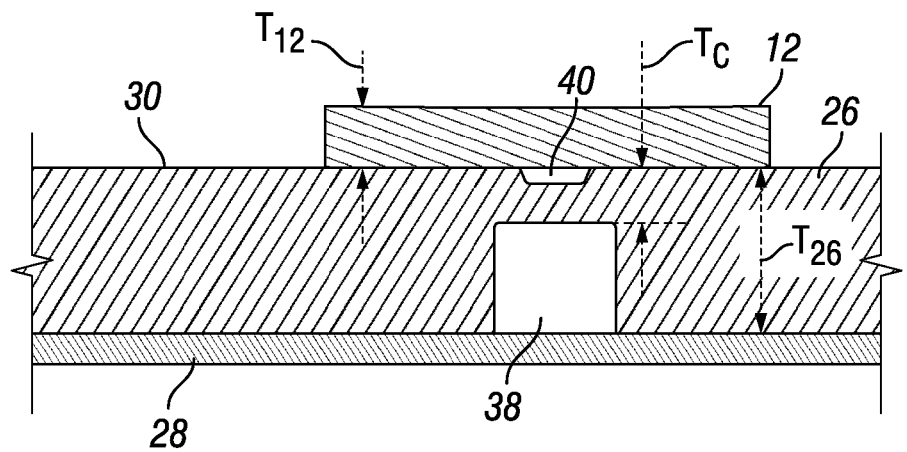
FIG. 3 is a cross-sectional detail view of the retreaded tire of FIG. 2 showing a recessed void and a circumferential band around the tire overtop the recessed void.

Additionally, recessed voids 38 may be provided recessed below the top side 30 of the tread. Recessed voids 38 may include cavities or grooves extending circumferentially and/or laterally along the tread. The recessed voids 38 may be arranged along the bottom side 32 of the tread, and in various embodiments, the recessed voids may be in fluid communication with the bottom side 32 of the tread. In certain embodiments, not shown, the recessed voids may be recessed or offset from both the top side and the bottom side such that the recessed void is in a middle portion of the tread. As shown in FIGS. 2 and 3, grooves 40 may be provided in the top side 30 of the tread 26 positioned near or overtop the recessed voids 38.

As shown in FIG. 2, each circumferential band 12 is positioned over one or more recessed void 38 providing support for the recessed void. During the curing operation, forces are applied to the tread 26 through the curing membrane 20. The circumferential bands 12 reinforce the tread above the recessed voids 38 reducing deformation of the recessed voids. In certain embodiments, the shape of the recessed void 38 after curing the retreaded tire is substantially the same as before curing the retreaded tire.

The circumferential band comprises an elastomeric material having an unstretched circumference smaller than the circumference of the assembled retreaded tire. In one example, the unstretched circumference of the circumferential band is approximately 5% smaller than the circumference of the assembled retreaded tire. In particular embodiments, the unstretched circumference of the circumferential band may be between 2% and 15% smaller than the circumference of the assembled retreaded tire. In alternative embodiments, the unstretched circumference of the circumferential band may be between 3% and 10% smaller than the circumference of the assembled retreaded tire. The circumferential band may comprise an elastomeric material such as natural and/or synthetic rubber. In particular embodiments, various thermoset or thermoplastic elastomeric materials may be used selected to be compatible with the retread tire curing process.

The circumferential band having an unstretched circumference smaller than the assembled retreaded tire is stretched expanding the band prior to arrangement around the retreaded tire. The circumferential band may be arranged around the assembled retreaded tire positioned over top the recessed void and the top side of the tread providing additional material thickness and support above the recessed void for the forces applied to the tread during the curing process. In particular embodiments, one circumferential band may be positioned over one recessed void. In alternative embodiments, one circumferential band may be positioned over a plurality of recessed voids. In one example shown in FIG. 3, the tread 26 has a thickness $T_{26}$ of approximately 8.2 mm, and a recessed void is provided recessed below the top side of the tread such that there is approximately 3.2 mm of tread material between the recessed groove and the top side of the tread, shown in FIG. 3 as thickness $T_C$. In this example, the recessed void is provided having a lateral width, shown in FIG. 2 as $W_{38}$, about 8 mm wide. A circumferential band is provided with a thickness $T_{12}$ of approximately 6.4 mm to reinforce the thickness $T_C$.

In various embodiments, a tread may include a recessed groove having a lateral width $W_{38}$, between 6 mm and 25 mm wide and having less than about 4 mm thickness, and may be between 1 mm and 4 mm, of tread material $T_C$ between the recessed groove and the top side of the tread, shown in FIG. 3 as thickness $T_C$. In such embodiments, the circumferential band may have a thickness $T_{12}$ between about 5 mm and 20 mm, or greater. In one such embodiment, the circumferential band may be provided with a thickness of approximately 6.4 mm. In other particular embodiments, for example, the recessed void may provide between about 2 mm and 10 mm thickness of tread material $T_C$ between the recessed void and the top side of the tread, and the circumferential band may have a thickness $T_{12}$ between about 4 mm and 15 mm. The width, thickness, material stiffness, and unstretched circumference of the circumferential band may be selected to provide support for the recessed voids reducing deformation of the recessed voids as desired.

The circumferential band over the recessed void supplements the material thickness $T_C$ so that pressure applied to the tire does not deform the relatively thin material thickness $T_C$. As such, the thickness of the circumferential band, shown in FIG. 3 as thickness $T_{12}$, is selected to be thick enough to provide support to the material over the recessed void. In particular embodiments, the combined thickness of the circumferential band thickness $T_{12}$ plus the thickness $T_C$ between the recessed groove and the top side of the tread may be equal to or greater than the lateral width $W_{38}$ across the recessed void. In certain alternative embodiments, the combined thickness of the circumferential band thickness $T_{12}$ plus the thickness $T_C$ between the recessed groove and the top side of the tread may be equal to or greater than 80% of the lateral width $W_{38}$ across the recessed void. In yet another alternative embodiment, the combined thickness of the circumferential band thickness $T_{12}$ plus the thickness $T_C$ between the recessed groove and the top side of the tread may be equal to or greater than 60% of the lateral width $W_{38}$ across the recessed void. It is contemplated that the circumferential band thickness $T_{12}$ may be any thickness for the circumferential band to provide desired amount of support for the tread material over top of the recessed void.

The circumferential band has a width larger than a lateral dimension of the recessed void. In one experimental example, a recessed groove was provided in a tread having a lateral width, shown in FIG. 2 as $W_{38}$, about 7.6 mm wide, and a circumferential band having a width, shown in FIG. 2 as $W_{12}$, approximately 50 mm was provided overtop the recessed groove. In particular embodiments, for example, the recessed void may be a groove in fluid communication with the bottom side of the tread having a lateral width $W_{38}$ between about 6 mm and 12 mm, and the circumferential band may have a width $W_{12}$ between about 15 mm and 60 mm. The width of the circumferential band is selected to be larger than a lateral dimension of the recessed void providing support for the recessed groove during curing, and with sufficient width to enable an operator to apply the circumferential band to the tire over the recessed void within manufacturing tolerances.

In one example, the recessed voids may be circumferential grooves extending longitudinally in a nonlinear, alternating path (also referred to as a zigzag path) about the tire tread. The circumferential band may have a width at least equal to a widthwise extent of the recessed void, which in this example may have a width at least equal to the widthwise extent of the zigzag path. In particular embodiments, the circumferential band has a width larger than a widthwise extent of the recessed void. Additionally, the width of the circumferential band may be such to span one or a plurality of tread features and tread elements on the top side of the tread as desired to provide desired support for the recessed voids.

Figure 4:
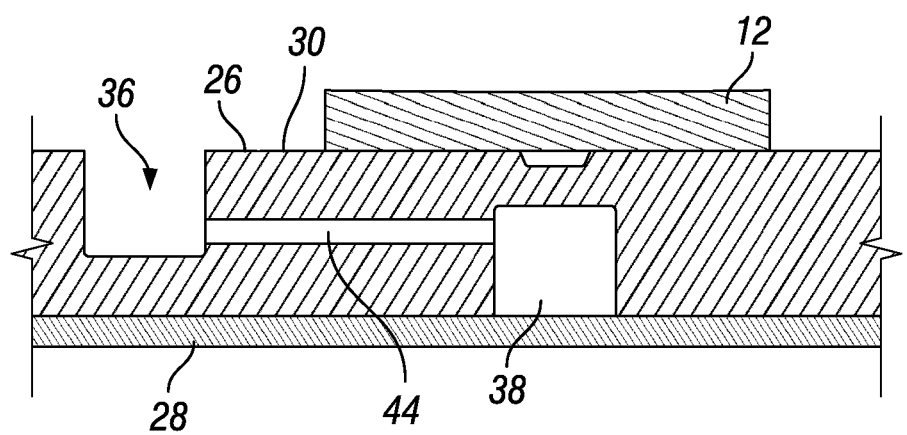
FIG. 4 is a cross-sectional detail view of the retreaded tire of FIG. 2 showing a vent passageway between a groove in communication with the top side of the tread and a recessed void.
Figure 5:
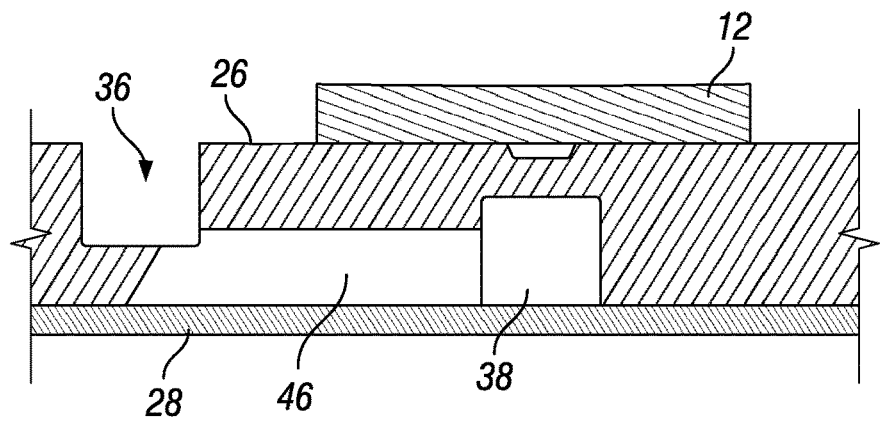
FIG. 5 is a cross-sectional detail view of the retreaded tire of FIG. 2 showing an alternative vent passageway between a groove in communication with the top side of the tread and a recessed void.
Figure 6:
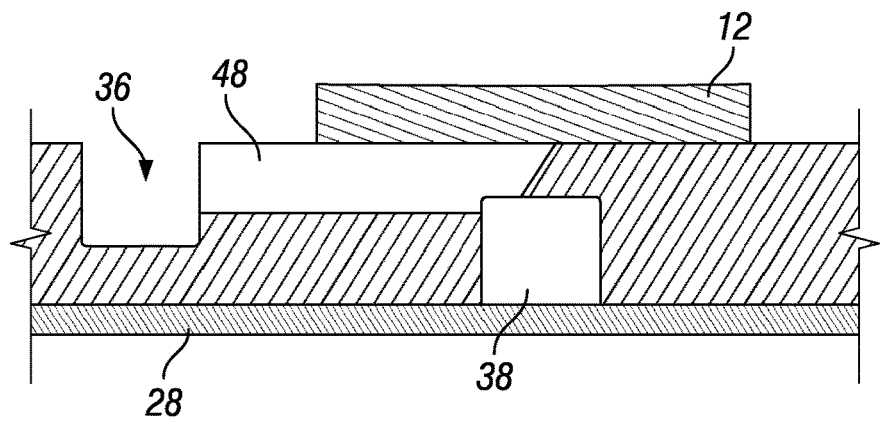
FIG. 6 is a cross-sectional detail view of the retreaded tire of FIG. 2 showing another alternative vent passageway between a groove in communication with the top side of the tread and a recessed void.
Figure 7:
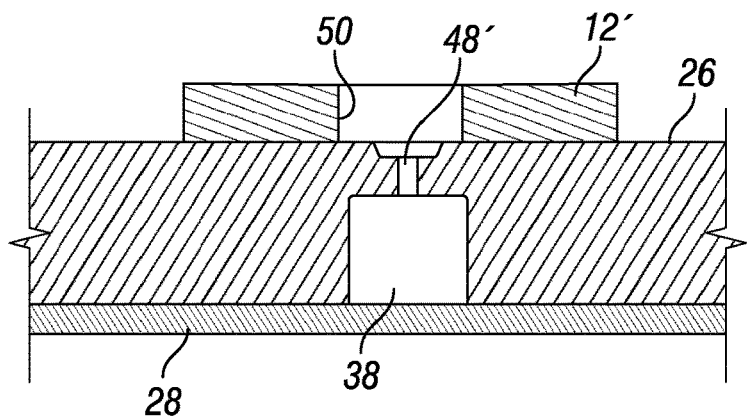
FIG. 7 is a cross-sectional detail view of the retreaded tire of FIG. 2 showing yet another alternative vent passageway between a recessed void and the top side of the tire through an aperture in a circumferential band around the tire positioned with the aperture overtop the vent passageway.

Referring now to FIGS. 4 to 8, in various embodiments of the present method, the tread may include one or more vent passageways extending within the tread in fluid communication with the recessed void and an outer side also referred to as "top side" of the tread when the circumferential band is positioned around the tire overtop the recessed void. The vent passageways may be provided to facilitate venting during tire curing operations to inhibit entrapment of air below the tread outer surface. As such, particular embodiments of the present method may include one or a plurality of vent passageways extending within the tread in fluid communication with the recessed void and the outer side of the tread. As shown by the examples in FIGS. 4 to 8, a vent passageway may extend within the tread in fluid communication with the recessed void 38 and a circumferential groove 36 or other tread feature on the top side 30 of the tread. In the example of FIG. 4, a lateral void or channel is provided recessed from the top side and the bottom side of the tread forming a vent passageway 44 between the recessed void 38 and the circumferential groove 36 in communication with the top side 30 of the tread. In the example of FIG. 5, a lateral void or groove is formed along the bottom side of the tread forming a vent passageway 46 between the recessed void 38 and the circumferential groove 36 in communication with the top side of the tread. In the examples of FIGS. 6 and 7, a vent passageway 48 is provided from the recessed void 38 to the top side of the tread. Various configurations of venting may be employed to provide a vent passageway from beneath the circumferential band 12 positioned around the tire. In the example of FIG. 6, a lateral void or groove is provided from the top side of the tread into the recessed void providing the vent passageway 48, the groove extending laterally a distance such that a portion of the vent passageway 48 is not covered by the circumferential band when the circumferential band is positioned around the tire. As shown in FIG. 6, the vent passageway 48 may extend laterally in fluid communication with the circumferential groove 36. In alternative embodiments, the lateral vent passageway may terminate without intersecting a circumferential groove 36.

Figure 8:
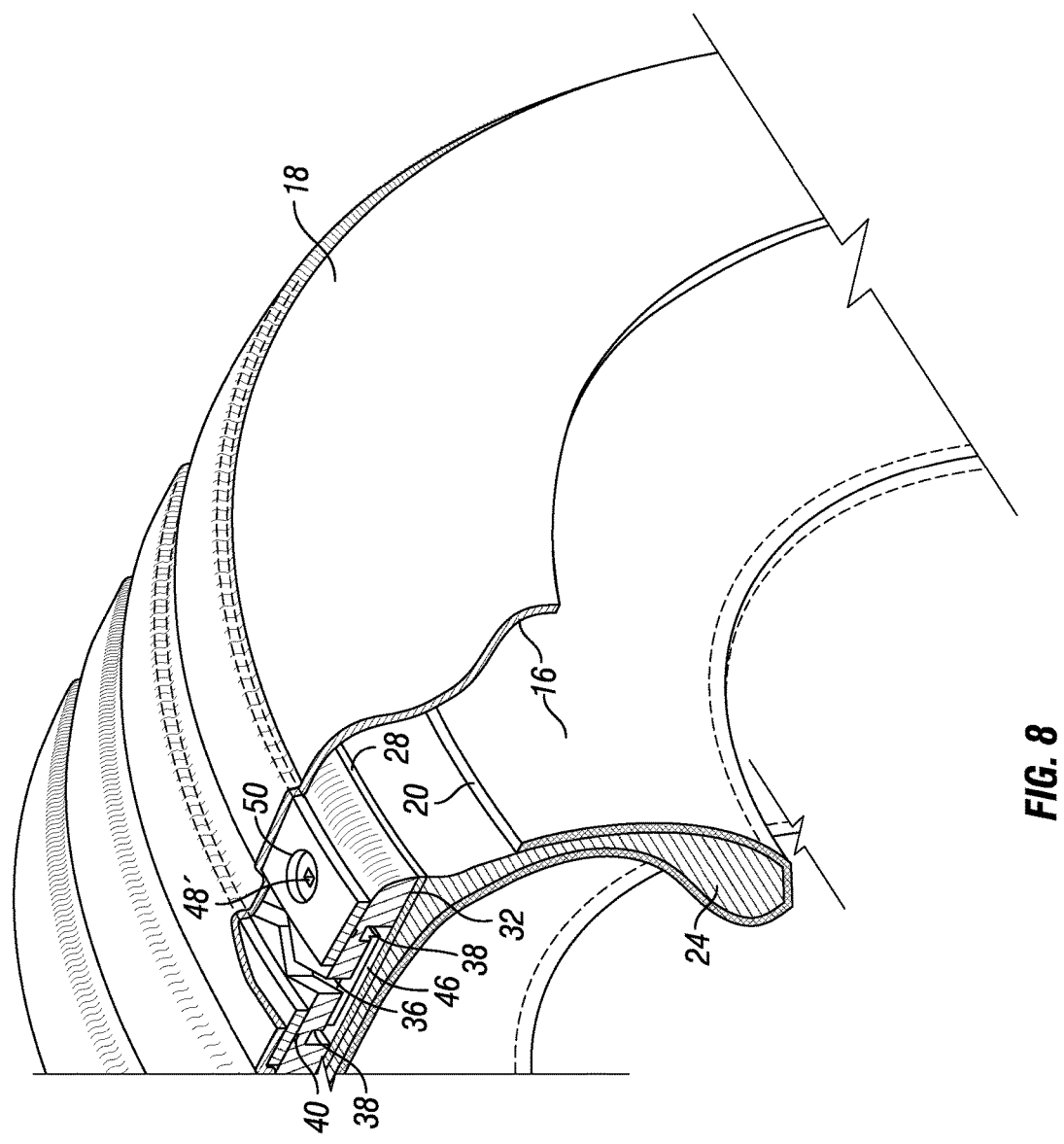
FIG. 8 is a partial perspective view of the retreaded tire of FIG. 7 showing the aperture in the circumferential band around the tire positioned with the aperture overtop the vent passageway.

As shown in FIG. 7, the vent passageways 48' may extend radially, or may extend at an angle from a radial direction, from the recessed void in communication with the top side of the tread or a tread feature in communication with the top side of the tread. In the example of FIGS. 7 and 8, the circumferential band 12' further includes an aperture 50 extending through a thickness of the band. When arranging the circumferential band around the assembled retreaded tire, the operator positions the aperture 50 overtop and in fluid communication with the vent passageway 48' as shown in FIGS. 7 and 8. In this embodiment, a plurality of apertures may be provided in the band 12' to speed positioning of the circumferential band around the tire. In an alternative embodiment, not shown, the vent passageway may extend within the tread in fluid communication with the recessed void and a lateral side of the tread. In other alternative embodiments, the vent passageways may extend radially, or may extend at an angle from a radial direction, between the recessed void and the ground engaging outer surface of the top side of the tread. Various venting techniques known in the art may be employed in the present methods.

As shown in FIG. 2, the bonding layer 28 is arranged between the bottom side 32 of the tread 26 and the tire carcass 24. As discussed above, the bonding layer 28 may be an adhesive or material curable by way of vulcanization, commonly referred to as liaison rubber or cushion gum, such as natural or synthetic rubber or any other elastomeric and/or polymeric material. In particular embodiments, the cushion gum layer 28 may have a thickness less than 1.0 mm between the tread and the tire carcass. In alternative embodiments, the cushion gum layer 28 may have a thickness between 0.5 mm and 0.8 mm between the tread and the tire carcass. A bonding layer 28 less than 1.0 mm may reduce flow of cushion gum material into recessed voids in communication with the bottom side of the tread, further maintaining void volume.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method of forming a retreaded tire comprising:
   providing a tread having a top side configured to engage a ground surface during tire operation and a bottom side configured to attach to an annular tire carcass configured for receiving the tread, the tread including a recessed groove recessed below the top side of the tread;
   arranging the tread around an outer circumference of the tire carcass in a desired position to form an assembled retreaded tire;
   arranging a removable circumferential band around the assembled retreaded tire positioned overtop the recessed groove and the top side of the tread where the circumferential band has an axial width less than a lateral width of the top side of the tread, where the circumferential band is separated from the recessed groove by a thickness of tread material between the recessed groove and the top side of the tread, and whereby the circumferential band provides an additional thickness of material above the recessed groove, where the circumferential band is substantially formed of an elastomeric material having an unstretched circumference smaller than the circumference of the assembled retreaded tire that is expanded prior to and for arrangement around the retreaded tire;
   placing a curing membrane around an outer circumference of the tread, an outer circumference of the circumferential band, and at least a portion of the tire carcass; and,
   curing the retreaded tire with the circumferential band arranged between the tread and the curing membrane, where the recessed groove is a void arranged along the bottom side of the tread and a shape of the void after the step of curing the retreaded tire is substantially the same as before the step of curing the retreaded tire.

2. The method according to claim 1 further comprising the step of:
   removing the curing membrane and the circumferential band after the step of curing has been performed.

3. The method according to claim 1 where the circumferential band is an elastomeric material having an unstretched circumference between 2% and 15% smaller than the circumference of the assembled retreaded tire.

4. The method according to claim 1 where the recessed groove is discontinuous around the circumference of the tread.

5. The method according to claim 1, further comprising the step of providing a layer of cushion gum having a thickness less than 1.0 mm between the tread and the tire carcass.

6. The method according to claim 1, further comprising the step of providing a layer of cushion gum having a thickness between 0.5 mm and 0.8 mm between the tread and the tire carcass.

7. The method according to claim 1, where a combined thickness of a thickness of the circumferential band and the thickness of tread material between the recessed groove and the top side of the tread is equal to or greater than 60 percent of a lateral width of the recessed groove.

8. The method according to claim 1, where the circumferential band is coated with an anti-bonding material.

9. The method according to claim 1 where the recessed groove is a longitudinal groove extending continuously around the circumference of the tread.

10. The method according to claim 9 where the axial width of the circumferential band is larger than a lateral width of the recessed groove.

11. The method according to claim 9 where the axial width of the circumferential band is at least equal to a lateral width of the recessed groove.

12. The method according to claim 1 where the tread provided includes a vent passageway extending within the tread, the vent passageway being in fluid communication with the recessed groove and an outer side of the tread.

13. The method according to claim 12, where the vent passageway is in fluid communication with the recessed groove and a void arranged along the top side of the tread.

14. The method according to claim 12 where the vent passageway is in fluid communication with the recessed groove and a lateral side of the tread.

15. The method according to claim 12, where the circumferential band further includes an aperture extending through a thickness of the band, and, the step of arranging a circumferential band around the assembled retreaded tire includes positioning the aperture overtop and in fluid communication with the vent passageway.

16. A method of forming a retreaded tire comprising:

providing a tread having a top side configured to engage a ground surface during tire operation and a bottom side configured to attach to an annular tire carcass configured for receiving the tread, the tread including a recessed groove recessed below the top side of the tread;

arranging the tread around an outer circumference of the tire carcass in a desired position to form an assembled retreaded tire;

arranging a removable circumferential band around the assembled retreaded tire positioned overtop the recessed groove and the top side of the tread where the circumferential band has an axial width less than a lateral width of the top side of the tread, where the circumferential band is separated from the recessed groove by a thickness of tread material between the recessed groove and the top side of the tread, where the circumferential band is substantially formed of an elastomeric material having an unstretched circumference smaller than the circumference of the assembled retreaded tire that is expanded prior to and for arrangement around the retreaded tire;

placing a curing membrane around an outer circumference of the tread, an outer circumference of the circumferential band, and at least a portion of the tire carcass; and, curing the retreaded tire with the circumferential band arranged between the tread and the curing membrane, where the recessed groove is a void arranged along the bottom side of the tread and a shape of the void after the step of curing the retreaded tire is substantially the same as before the step of curing the retreaded tire.

* * * * *